(12) United States Patent
Miyazaki

(10) Patent No.: US 8,516,282 B2
(45) Date of Patent: Aug. 20, 2013

(54) TRANSMISSION DEVICE AND METHOD FOR PUTTING TRANSMISSION DEVICE TO SLEEP

(75) Inventor: Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 12/776,700

(22) Filed: May 10, 2010

(65) Prior Publication Data

US 2010/0287422 A1 Nov. 11, 2010

(30) Foreign Application Priority Data

May 11, 2009 (JP) ................................. 2009-115037

(51) Int. Cl.
*G06F 1/00* (2006.01)
*G06F 1/26* (2006.01)
*G06F 1/32* (2006.01)

(52) U.S. Cl.
USPC .......................................... 713/320; 713/310

(58) Field of Classification Search
USPC .................................................. 713/300–324
See application file for complete search history.

(56) References Cited

U.S. PATENT DOCUMENTS

| | | | | |
|---|---|---|---|---|
| 5,684,947 A * | 11/1997 | Horie | ............................... | 714/37 |
| 5,828,568 A * | 10/1998 | Sunakawa et al. | .............. | 700/79 |
| 6,553,501 B1 * | 4/2003 | Yokoe | ........................... | 713/320 |
| 6,622,251 B1 * | 9/2003 | Lindskog et al. | ............ | 713/300 |
| 7,027,057 B2 * | 4/2006 | Jain et al. | ...................... | 345/520 |
| 7,176,785 B2 * | 2/2007 | Edogawa et al. | ........ | 340/286.02 |
| 7,506,188 B2 * | 3/2009 | Krantz et al. | .................. | 713/320 |
| 7,577,113 B2 * | 8/2009 | Alon et al. | ..................... | 370/311 |
| 7,643,964 B2 * | 1/2010 | Andrianov | .................... | 702/176 |
| 7,752,473 B1 * | 7/2010 | Kwa et al. | ..................... | 713/323 |
| 7,877,617 B2 * | 1/2011 | Kaneda | ......................... | 713/300 |
| 7,925,908 B2 * | 4/2011 | Kim | ............................. | 713/320 |
| 7,971,079 B2 * | 6/2011 | Ezura | ............................ | 713/320 |
| 2002/0109857 A1 * | 8/2002 | Ueno et al. | ................... | 358/1.14 |

(Continued)

FOREIGN PATENT DOCUMENTS

JP 59-114929 7/1984
JP 01035769 A * 2/1989

(Continued)

OTHER PUBLICATIONS

Mangharam, R.; Rajkumar, R.; Pollin, S.; Catthoor, F.; Bougard, B.; Van Der Perre, L.; Moeman, I., "Optimal fixed and scalable energy management for wireless networks,"INFOCOM 2005. 24th Annual Joint Conference of the IEEE Computer and Communications Societies. Proceedings IEEE , vol. 1, pp. 114,125 vol. 1, Mar. 1-17, 2005.*

(Continued)

*Primary Examiner* — Faisal M Zaman
(74) *Attorney, Agent, or Firm* — Staas & Halsey LLP

(57) ABSTRACT

A transmission device including at least one transmitter/receiver unit that is coupled to another transmission device via a communication line, a power supply unit that supplies power to the at least one transmitter/receiver unit, and a control unit that notifies the another transmission device about first sleep start information specifying time at which an operating mode of the at least one transmitter/receiver unit is to be changed to a sleep mode and that stops the supply of power from the power supply unit to the at least one transmitter/receiver unit at the time specified by the first sleep start information.

6 Claims, 5 Drawing Sheets

(56) References Cited

U.S. PATENT DOCUMENTS

| | | | |
|---|---|---|---|
| 2003/0135772 A1* | 7/2003 | Haulk et al. | 713/324 |
| 2004/0083396 A1* | 4/2004 | Perahia | 713/300 |
| 2004/0120691 A1* | 6/2004 | Ohnishi | 386/46 |
| 2005/0122927 A1* | 6/2005 | Wentink | 370/311 |
| 2005/0136882 A1* | 6/2005 | Boulton | 455/343.4 |
| 2005/0268010 A1* | 12/2005 | Igari | 710/100 |
| 2006/0005058 A1* | 1/2006 | Chen et al. | 713/320 |
| 2006/0053318 A1* | 3/2006 | One | 713/300 |
| 2006/0067357 A1* | 3/2006 | Rader | 370/463 |
| 2006/0099980 A1* | 5/2006 | Nielsen et al. | 455/507 |
| 2006/0248364 A1* | 11/2006 | Gutman et al. | 713/300 |
| 2006/0271798 A1* | 11/2006 | Tandon | 713/300 |
| 2006/0291408 A1* | 12/2006 | Huang et al. | 370/311 |
| 2007/0113110 A1* | 5/2007 | Mizutani | 713/300 |
| 2007/0143637 A1* | 6/2007 | Tsai | 713/300 |
| 2007/0230972 A1* | 10/2007 | Akashi | 399/16 |
| 2007/0250726 A1* | 10/2007 | Rossetti et al. | 713/320 |
| 2008/0155549 A1* | 6/2008 | Blinick et al. | 718/103 |
| 2008/0195782 A1* | 8/2008 | Yi | 710/110 |
| 2009/0070604 A1* | 3/2009 | Kumakura | 713/310 |
| 2009/0150698 A1* | 6/2009 | Lee | 713/323 |
| 2010/0098102 A1* | 4/2010 | Banks et al. | 370/406 |
| 2010/0157463 A1* | 6/2010 | Arizono et al. | 360/73.03 |
| 2010/0241880 A1* | 9/2010 | Wertheimer et al. | 713/310 |
| 2010/0254290 A1* | 10/2010 | Gong et al. | 370/311 |

FOREIGN PATENT DOCUMENTS

| | | | |
|---|---|---|---|
| JP | 4-297169 | | 10/1992 |
| JP | 8-191273 | | 7/1996 |
| JP | 2002016962 A | * | 1/2002 |
| JP | 2005004536 A | * | 1/2005 |
| JP | 2008-217108 | | 9/2008 |
| JP | 2009294314 A | * | 12/2009 |
| JP | 2010287132 A | * | 12/2010 |
| JP | 2011009872 A | * | 1/2011 |

OTHER PUBLICATIONS

Awan, M.A.; Petters, S.M., "Enhanced Race-To-Halt: A Leakage-Aware Energy Management Approach for Dynamic Priority Systems," Real-Time Systems (ECRTS), 2011 23rd Euromicro Conference on , pp. 92,101, Jul. 5-8, 2011.*

Junchao Ma; Wei Lou; YanWei Wu; Mo Li; Guihai Chen, "Energy Efficient TDMA Sleep Scheduling in Wireless Sensor Networks," INFOCOM 2009, IEEE , pp. 630,638, Apr. 19-25, 2009.*

Koushanfar, F.; Davare, A.; Potkonjak, M.; Sangiovanni-Vincentelli, A., "Low power coordination in wireless ad-hoc networks," Low Power Electronics and Design, 2003. ISLPED '03. Proceedings of the 2003 International Symposium on , pp. 475,480, Aug. 25-27, 2003.*

* cited by examiner

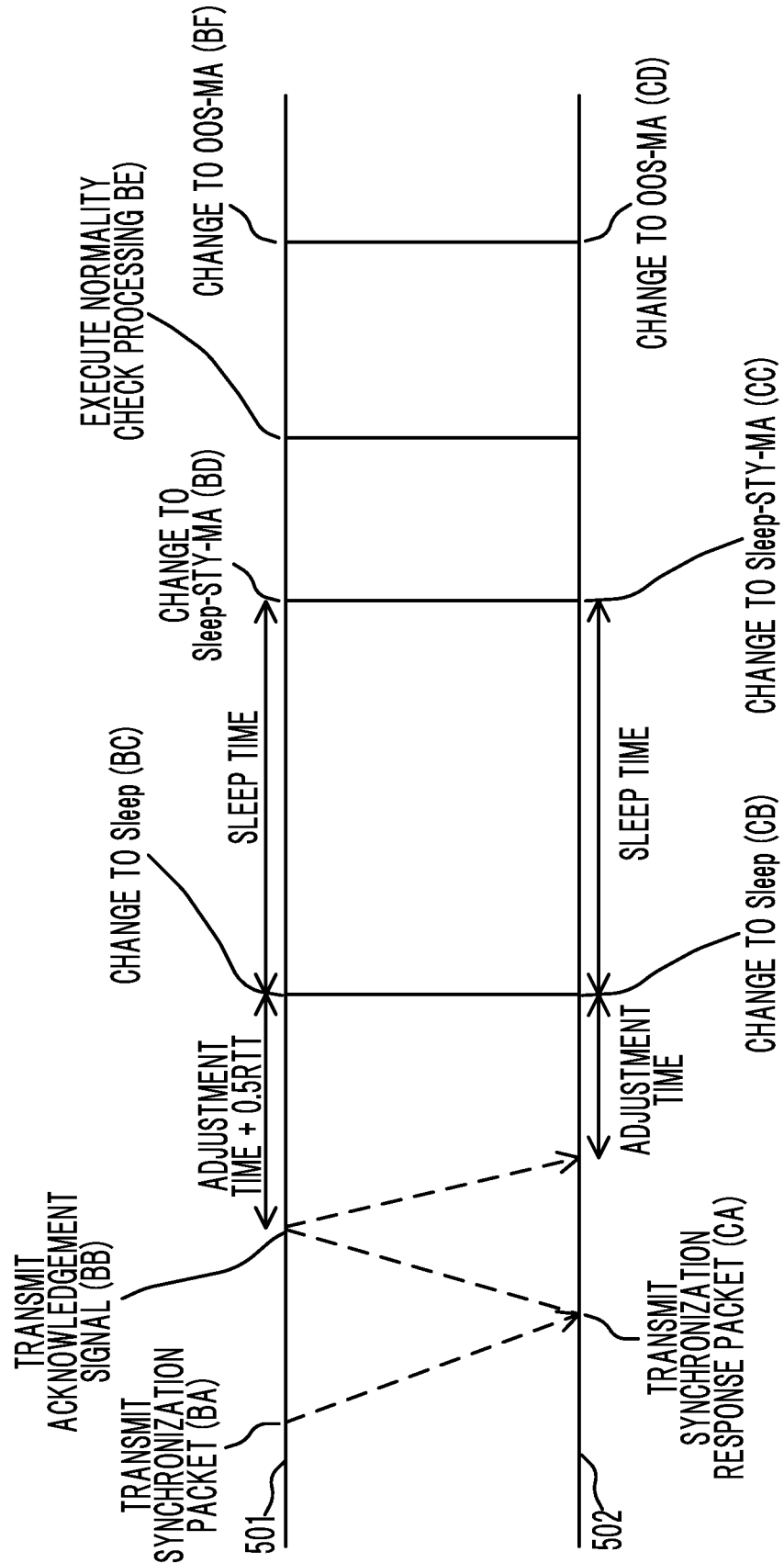

TRANSMISSION DEVICE AND METHOD FOR PUTTING TRANSMISSION DEVICE TO SLEEP

CROSS-REFERENCE TO RELATED APPLICATIONS

This application is based upon and claims the benefit of priority from the prior Japanese Patent Application No. 2009-115037 filed on May 11, 2009, the entire contents of which are incorporated herein by reference.

FIELD

The embodiments disclosed herein relate to a transmission device and a method for the transmission device to sleep.

BACKGROUND

A transmission device, such as an optical transmission device, used for communication may have multiple transmitter/receiver circuits so as to allow communication via multiple lines. In such a transmission device, one or some circuits, such as a transmitter/receiver circuit coupled to a backup line, may not be temporarily used.

Accordingly, in order to reduce the amount of power consumed by the transmission device, technologies for putting such a circuit that is not in use into a sleep mode have been developed (e.g., refer to Japanese Unexamined Patent Application Publication Nos. 8-191273, 4-297169, 2008-217108, and 59-114929).

SUMMARY

A transmission device including at least one transmitter/receiver unit that is coupled to another transmission device via a communication line, a power supply unit that supplies power to the at least one transmitter/receiver unit, and a control unit that notifies the another transmission device about first sleep start information specifying time at which an operating mode of the at least one transmitter/receiver unit is to be changed to a sleep mode and that stops the supply of power from the power supply unit to the at least one transmitter/receiver unit at the time specified by the first sleep start information.

BRIEF DESCRIPTION OF DRAWINGS

FIG. 5 illustrates one example of a sequence in which the operating mode of the transmitter/receiver module included in the transmission device according to one embodiment and the operating mode of a transmitter/receiver module of a transmission device opposing the transmitter/receiver module are changed to the sleep modes and then the two transmitter/receiver modules are restarted.

DESCRIPTION OF EMBODIMENTS

When an operator puts one of two opposing transmission devices into the sleep mode, the other transmission device does not receive a signal from the transmission device put into the sleep mode. Thus, the other device issues an alarm indicating that no signal can be received. In order to prevent such an alarm from being issued, the operator needs to put the two opposing transmission devices into the sleep modes simultaneously. Thus, the operator has to operate both of the two opposing transmission devices in accordance with complicated operation procedures.

Accordingly, an object of the present disclosure is to provide a transmission device that is capable of putting another transmission device at an opposite communication end into the sleep mode without causing it to issue an alarm.

A transmission device according to one embodiment will be described below with reference to the accompanying drawings.

The transmission device has at least one transmitter/receiver module. When the transmission device attempts to put an operating mode of one of the transmitter/receiver modules into a sleep mode, the transmission device notifies an opposing transmission device to which communication is to be performed via the transmitter/receiver module about sleep-start time at which the operating mode is to be put into the sleep mode. The transmission device then puts the operating mode of the transmitter/receiver module into the sleep mode when the sleep start time is reached, and also allows the opposing transmission to enter the sleep mode simultaneously, thereby making it possible to prevent the opposing transmission device from issuing an alarm.

Figure 1:
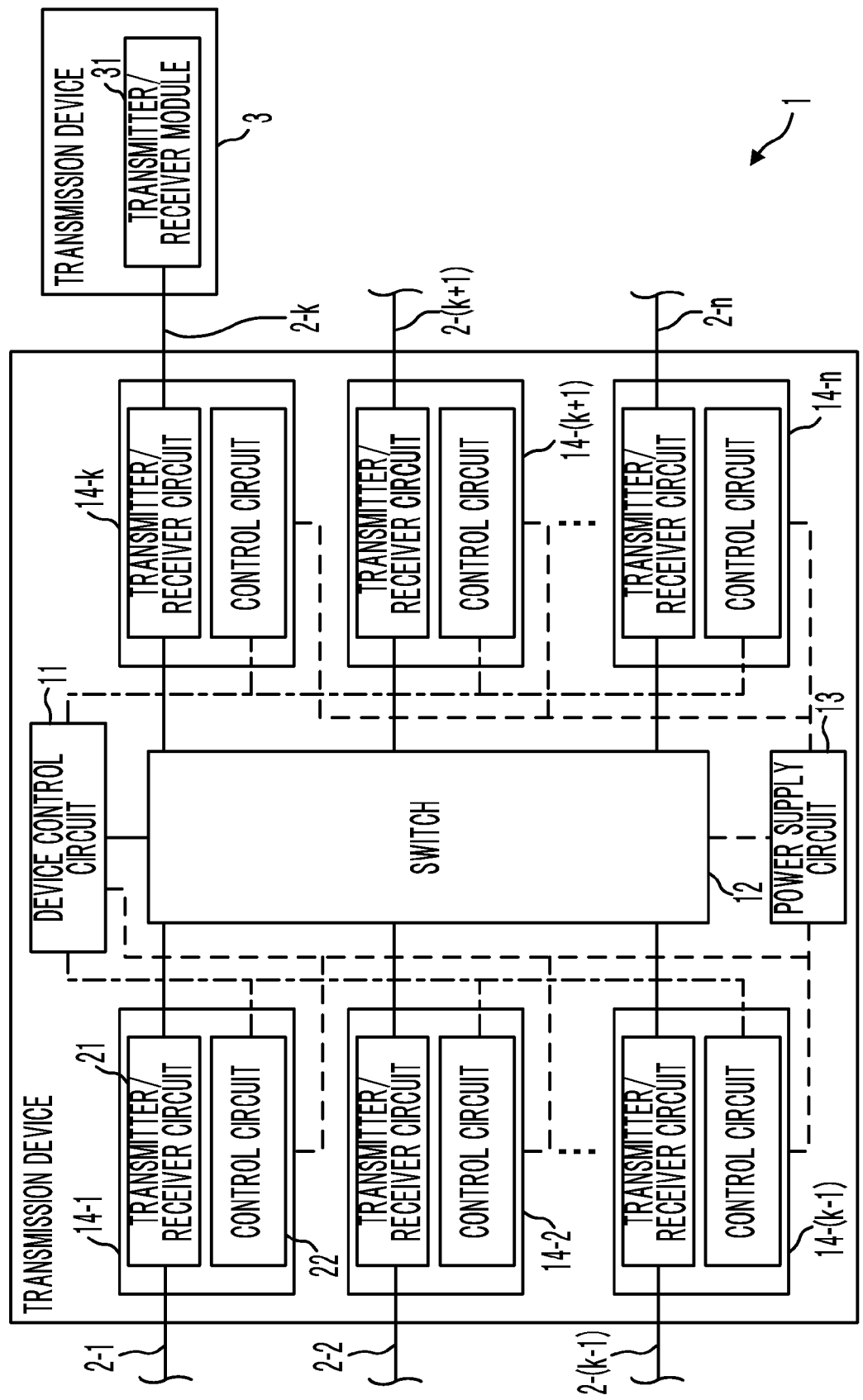
FIG. 1 is a schematic block diagram of a transmission device according to one embodiment.

FIG. 1 is a schematic block diagram of a transmission device 1 according to one embodiment. The transmission device 1 includes a device control circuit 11, a switch 12, a power-supply circuit 13, and at least one transmitter/receiver module 14-1 to 14-n (where n is a natural number).

The device control circuit 11 has a processor, a timer, a memory, and a peripheral circuit. The device control circuit 11 controls individual sections of the transmission device 1. The device control circuit 11 is coupled to a high-order system (not illustrated), such as a network management system or an element management system. When an operator inputs, to the high-order system, a command for changing the operating mode of the transmitter/receiver module 14-k (where 1≦k≦n) of the transmitter/receiver modules 14-1 to 14-n, the device control circuit 11 receives the command from the high-order system. The device control circuit 11 transmits, to the transmitter/receiver module 14-k specified by the command received from the high-order system, a control signal for changing to an operating mode corresponding to the command. Alternatively, the device control circuit 11 may change the operating mode of the particular transmitter/receiver module 14-k in accordance with a preset schedule stored in the memory included in the device control circuit 11. In this case, for example, when the internal timer of the device control circuit 11 determines that a predetermined time specified by the schedule is reached, the device control circuit 11 transmits, to the transmitter/receiver module 14-k, a control signal for changing to the operating mode specified by the schedule.

In addition, the device control circuit 11 may store the current operating modes of the transmitter/receiver modules 14-1 to 14-n in conjunction with identification numbers of the transmitter/receiver modules 14-1 to 14-n. In accordance with a request from the high-order system, the device control circuit 11 may report the current operating modes of the transmitter/receiver modules 14-1 to 14-to the high-order system. The device control circuit 11 may also transfer an alarm signal, received from the transmitter/receiver module 14-k, to the high-order system.

The switch 12 transfers a data signal, received from the transmitter/receiver module 14-k, to another transmitter/receiver module 14-m (where $1 \leq m \leq n$, $m \neq k$) in accordance with destination information contained in the data signal. The destination information is, for example, a MAC (media access control) address or an IP (internet protocol) address of a device that is the destination of the data signal. The switch 12 stores, for example, a routing table in which the destination information of destination devices and corresponding transmitter/receiver modules are associated with each other. The switch 12 refers to the routing table to determine a signal transfer destination.

The power-supply circuit 13 is coupled to a commercial power source (not illustrated) or a battery (not illustrated). The power-supply circuit 13 converts power, supplied from the commercial power source or the battery, into power with a predetermined voltage and supplies the converted power to the individual sections of the transmission device 1.

The transmitter/receiver modules 14-1 to 14-n communicate with other transmission devices in accordance with a predetermined communication standard. Thus, the transmitter/receiver modules 14-1 to 14-n are coupled to the other transmission devices via communication lines 2-1 to 2-n, respectively. For example, the transmitter/receiver module 14-k is coupled to a transmitter/receiver module 31 of a transmission device 3 via the communication line 2-k. With respect to the types of operating modes of the transmitter/receiver module 31 and a change in the operating mode thereof, the transmission device 3 may have a function and a configuration that are the same as or similar to those of the transmission device 1.

The communication lines 2-1 to 2-n may be implemented by, for example, optical fibers, twisted pair cables, or coaxial cables. At least one repeater circuit for amplifying a signal transmitted via each of the communication lines 2-1 to 2-n may be provided along each of the communication lines 2-1 to 2-n. The transmitter/receiver modules 14-1 to 14-n are coupled to the switch 12. Each of the transmitter/receiver modules 14-1 to 14-n has a transmitter/receiver circuit 21 and a control circuit 22. Since the transmitter/receiver modules 14-1 to 14-n may have the same function and the same configuration, a description below is given of the transmitter/receiver module 14-k.

The transmitter/receiver circuit 21 detects, for example, a frame from an optical or electrical signal received from the transmitter/receiver module 31 of the opposing transmission device 3 via the communication line 2-k in accordance with the predetermined communication standard. The transmitter/receiver circuit 21 then extracts a data signal from the frame. The transmitter/receiver circuit 21 performs error correction processing, such as forward error correction (FEC), on the extracted data signal. The transmitter/receiver circuit 21 outputs the error-corrected data signal to the switch 12. Through the error correction processing, the transmitter/receiver circuit 21 measures a bit error rate for the extracted data signal. The transmitter/receiver circuit 21 reports, to the control circuit 22, the measured bit error rate as line state information representing the state of communication between the transmitter/receiver module 14-k and the transmitter/receiver module 31. The transmitter/receiver circuit 21 may report, as the line state information, a signal indicating whether or not a frame was successfully detected from the signal received via the communication line 2-k.

The transmitter/receiver circuit 21 also maps the data signal, received from the switch 12, with a frame in conjunction with error correction code and header information. The transmitter/receiver circuit 21 then transmits, in the form of an optical or electrical signal, the frame to the transmitter/receiver module 31 of the transmission device 3 via the communication line 2-k.

Examples of the predetermined communication standard include SONET (Synchronous Optical Network)/SDH (Synchronous Digital Hierarchy) and Ethernet®.

The control circuit 22 has a processor, a timer, a memory, and a peripheral circuit. The control circuit 22 switches the operating mode of the transmitter/receiver module 14-k in response to a control signal sent from the device control circuit 11 or in response to the line state information reported from the transmitter/receiver circuit 21. Further, the control circuit 22 switches the operating mode of the transmitter/receiver module 14-k in response to a signal that is received from the transmitter/receiver module 31 and that indicates that the operating mode of the transmitter/receiver module 31 is to be changed. The control circuit 22 stores the current operating mode of the transmitter/receiver module 14-k. Each time the operating mode of the transmitter/receiver module 14-k is changed, the control circuit 22 may also report the current operating mode of the transmitter/receiver module 14-k to the device control circuit 11.

In addition, when the operating mode of the transmitter/receiver module 14-k is a sleep mode, the control circuit 22 stops the supply of power from the power-supply circuit 13 to the transmitter/receiver circuit 21.

Figure 2:
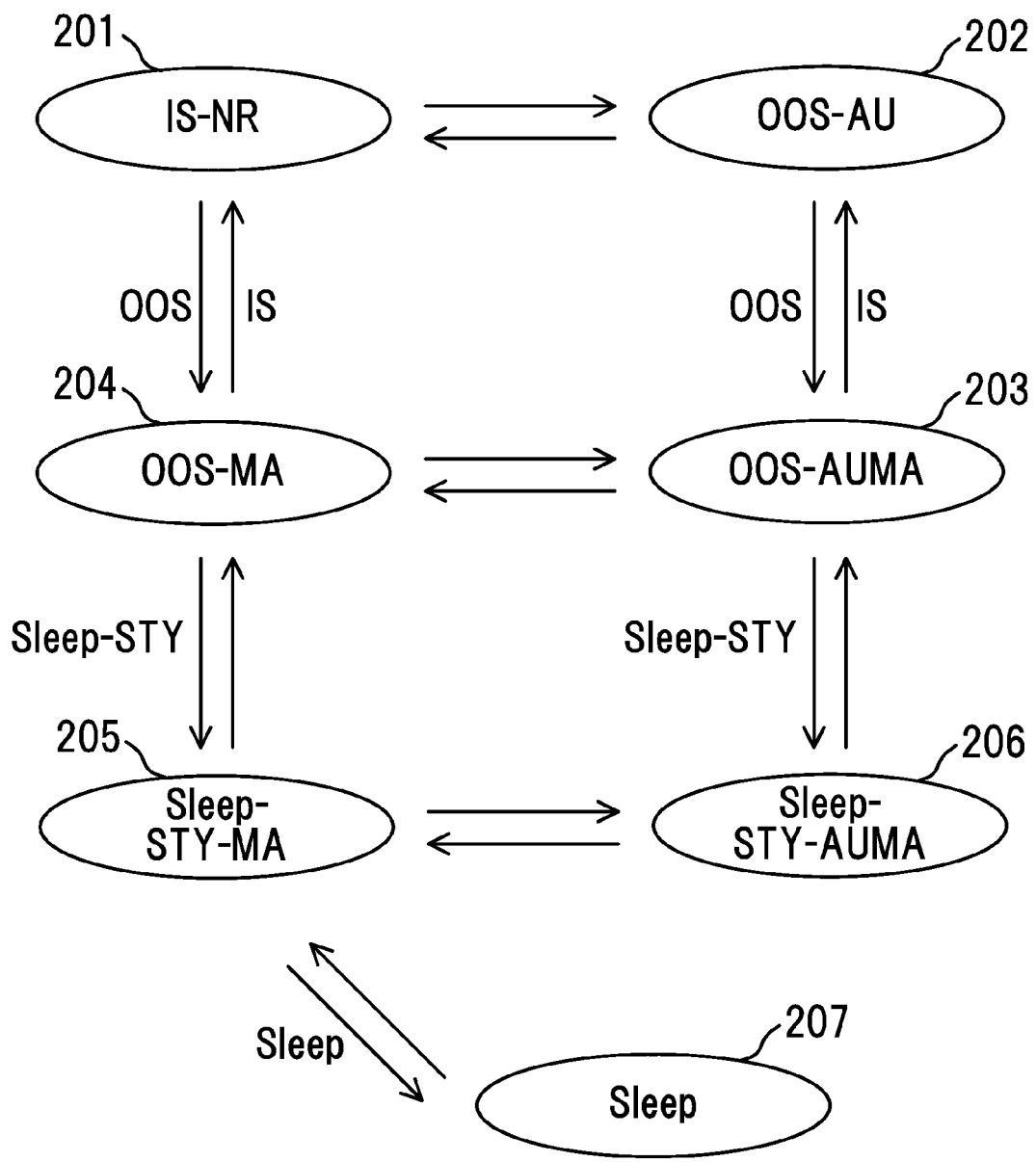
FIG. 2 illustrates changes in an operating mode of a transmitter/receiver module included in the transmission device according to one embodiment.

FIG. 2 is a diagram illustrating changes in the operating mode of the transmitter/receiver module 14-k. The types of operating modes of the transmitter/receiver module 14-k include a normal operating mode 201, a stop autonomous mode 202, a stop autonomous management mode 203, a stop management mode 204, a sleep standby management mode 205, a sleep standby autonomous management mode 206, and a sleep mode 207.

The normal operating mode (In-Service and Normal, IS-NR) 201 represents a mode in which the transmitter/receiver module 14-k is providing a communication service and is operating normally. When the operating mode of the transmitter/receiver module 14-k is IS-NR, the transmitter/receiver module 14-k transmits a data signal, received via the switch 12, to the transmitter/receiver module 31 of the transmission device 3 opposing the transmitter/receiver module 14-k via the communication line 2-k. The transmitter/receiver module 14-k outputs a data signal, received from the transmitter/receiver module 31 of the transmission device 3 via the communication line 2-k, to the switch 12.

The stop autonomous mode (Out-of-Service Autonomous, OOS-AU) 202 represents a mode in which the transmitter/receiver module 14-k is providing a communication service and cannot communicate with the transmitter/receiver module 31. When the operating mode of the transmitter/receiver module 14-k is OOS-AU, the transmitter/receiver module 14-k transmits a data signal, received via the switch 12, to the transmitter/receiver module 31 via the communication line 2-k. Also, even though the transmitter/receiver module 14-k attempts to receive a data signal transmitted from the transmitter/receiver module 31 via the communication line 2-k, the transmitter/receiver module 14-k cannot reproduce the data signal. Thus, the control circuit 22 receives, from the transmitter/receiver circuit 21 of the transmitter/receiver module 14-k, the line state information indicating that the data signal cannot be reproduced. The control circuit 22 thus outputs, to the device control circuit 11, an alarm signal indicating that communication with the transmitter/receiver module 31 cannot be performed.

The stop autonomous management mode (Out-of-Service Autonomous Management, OOS-AUMA) 203 represents a mode in which the operation service provision of the transmitter/receiver module 14-k is stopped by the operator and the transmitter/receiver module 14-k cannot communicate with the transmitter/receiver module 31. When the operating mode of the transmitter/receiver module 14-k is OOS-AUMA, the transmitter/receiver module 14-k does not transmit a data signal received via the switch 12. In this case, the transmitter/receiver module 14-k transmits a test signal to the transmitter/receiver module 31 via the communication line 2-k. The transmitter/receiver circuit 21 of the transmitter/receiver module 14-k also receives a test signal transmitted from the transmitter/receiver module 31 via the communication line 2-k and generates line state information on the basis of the received test signal. The transmitter/receiver circuit 21 then reports the line state information to the control circuit 22 of the transmitter/receiver module 14-k. In OOS-AUMA, the transmitter/receiver module 14-k cannot reproduce the test signal transmitted from the transmitter/receiver module 31. Thus, the control circuit 22 receives the line state information indicating that the test signal cannot be reproduced. The control circuit 22 thus outputs, to the device control circuit 11, an alarm signal indicating that communication with the transmitter/receiver module 31 cannot be performed.

The stop management mode (Out-of-Service and Management, OOS-MA) 204 represents a mode in which the communication service provision of the transmitter/receiver module 14-k is stopped by the operator. When the operating mode of the transmitter/receiver module 14-k is OOS-MA, the transmitter/receiver module 14-k does not transmit a data signal received via the switch 12. In this case, the transmitter/receiver module 14-k transmits a test signal to the transmitter/receiver module 31 via the communication line 2-k. The transmitter/receiver module 14-k also receives a test signal transmitted from the transmitter/receiver module 31 via the communication line 2-k. The transmitter/receiver circuit 21 of the transmitter/receiver module 14-k generates line state information and reports the line state information to the control circuit 22 of the transmitter/receiver module 14-k. In OOS-MA, the transmitter/receiver module 14-k can reproduce the test signal transmitted from the transmitter/receiver module 31. The control circuit 22, therefore, does not output an alarm signal indicating that communication with the transmitter/receiver module 31 cannot be performed.

The sleep standby management mode (Sleep-Standby and Management, Sleep-STY-MA) 205 represents a mode in which the transmitter/receiver module 14-k is on standby to change to the sleep mode. When the operating mode of the transmitter/receiver module 14-k is Sleep-STY-MA, the transmitter/receiver module 14-k executes sleep-mode change processing, which is described below. Alternatively, the transmitter/receiver module 14-k determines whether or not it can communicate with the transmitter/receiver module 31 when the operating mode of the transmitter/receiver module 14-k returns from the sleep mode. In accordance with the result of the determination, the transmitter/receiver module 14-k changes the operating mode thereof to OOS-MA or the sleep standby autonomous management mode 206 described below.

The sleep standby autonomous management mode (Sleep-Standby and Autonomous Management, Sleep-STY-AUMA) 206 represents a mode in which the transmitter/receiver module 14-k is on standby to change to the sleep mode and cannot communicate with the transmitter/receiver module 31. When the operating mode of the transmitter/receiver module 14-k is Sleep-STY-AUMA, the transmitter/receiver module 14-k transmits a test signal to the transmitter/receiver module 31 via the communication line 2-k. The transmitter/receiver circuit 21 of the transmitter/receiver module 14-k also receives a test signal transmitted from the transmitter/receiver module 31 via the communication line 2-k and generates line state information on the basis of the received test signal. The transmitter/receiver circuit 21 then reports the line state information to the control circuit 22 of the transmitter/receiver module 14-k. In Sleep-STY-AUMA, the transmitter/receiver module 14-k cannot reproduce the test signal transmitted from the transmitter/receiver module 31. Thus, the control circuit 22 receives the line state information indicating that the test signal cannot be reproduced. Thus, after the state in which the test signal cannot be reproduced continues for a predetermined period of time, the control circuit 22 outputs, to the device control circuit 11, an alarm signal indicating that communication with the transmitter/receiver module 31 cannot be performed.

The sleep mode (Sleep) 207 represents a mode in which the transmitter/receiver module 14-k is sleeping. When the operating mode of the transmitter/receiver module 14-k is Sleep, the transmitter/receiver module 14-k does not transmit any signal to the communication line 2-k and also discards any signal received from the communication line 2-k. The control circuit 22 also does not output an alarm signal indicating that the communication with the transmitter/receiver module 31 cannot be performed, even when the transmitter/receiver circuit 21 does not receive a reproducible signal from the communication line 2-k. The supply of power from the transmitter/receiver circuit 21 to the power-supply circuit 13 is also stopped.

The control circuit 22 can change, of the above-described operating modes of the transmitter/receiver module 14-k, the mode of the transmitter/receiver module 14-k among IS-NR, OOS-AU, OOS-AUMA, and OOS-MA in accordance with, for example, a Telcordia mode-change model.

That is, in a case in which the operating mode of the transmitter/receiver module 14-k is IS-NR, when a control signal OOS for stopping the transmitter/receiver module 14-k from providing the communication service is received from the device control circuit 11, the control circuit 22 changes the operating mode of the transmitter/receiver module 14-k to OOS-MA.

In a case in which the operating mode of the transmitter/receiver module 14-k is IS-NR, when the line state information indicating that communication with the transmitter/receiver module 31 of the transmission device 3 cannot be normally performed is received from the transmitter/receiver circuit 21, the control circuit 22 changes the operating mode of the transmitter/receiver module 14-k to OOS-AU.

In the case in which the operating mode of the transmitter/receiver module 14-k is OOS-AU, when a control signal OOS for stopping the transmitter/receiver module 14-k from providing the communication service is received from the device control circuit 11, the control circuit 22 changes the operating mode of the transmitter/receiver module 14-k to OOS-AUMA.

In the case in which the operating mode of the transmitter/receiver module 14-k is OOS-AU, when the line state information indicating that communication with the transmitter/receiver module 31 of the transmission device 3 can be normally performed is received from the transmitter/receiver circuit 21, the control circuit 22 changes the operating mode of the transmitter/receiver module 14-k to IS-NR.

In a state in which the operating mode of the transmitter/receiver module 14-k is OOS-MA, when a control signal IS for causing the transmitter/receiver module 14-k to start a communication service is received from the device control circuit 11, the control circuit 22 changes the operating mode of the transmitter/receiver module 14-k to IS-NR.

In the case in which the operating mode of the transmitter/receiver module 14-k is OOS-MA, when the line state information indicating that communication with the transmitter/receiver module 31 of the transmission device 3 cannot be normally performed is received from the transmitter/receiver circuit 21, the control circuit 22 changes the operating mode of the transmitter/receiver module 14-k to OOS-AUMA.

In the case in which the operating mode of the transmitter/receiver module 14-k is OOS-AUMA, when a control signal IS for causing the transmitter/receiver module 14-k to start a communication service is received from the device control circuit 11, the control circuit 22 changes the operating mode of the transmitter/receiver module 14-k to OOS-AU.

In the case in which the operating mode of the transmitter/receiver module 14-k is OOS-AUMA, when the line state information indicating that communication with the transmitter/receiver module 31 of the transmission device 3 can be normally performed is received from the transmitter/receiver circuit 21, the control circuit 22 changes the operating mode of the transmitter/receiver module 14-k to OOS-MA.

In the case in which the operating mode of the transmitter/receiver module 14-k is OOS-MA, when a control signal Sleep-STY for putting the operating mode of the transmitter/receiver module 14-k into Sleep is received from the device control circuit 11 or when a specified sleep start time is reached, the control circuit 22 executes sleep-mode change processing described below. After the sleep-mode change processing finishes properly, the control circuit 22 changes the operating mode of the transmitter/receiver module 14-k to Sleep.

On the other hand, when the sleep-mode change processing does not finish properly, the control circuit 22 changes the operating mode of the transmitter/receiver module 14-k to Sleep-STY-AUMA.

For change of the operating mode of the transmitter/receiver module 14-k to Sleep, a synchronization packet or a synchronization response packet is exchanged between the transmitter/receiver module 14-k and the transmitter/receiver module 31. The synchronization packet and the synchronization response packet contain information required to simultaneously change the operating modes of the two transmitter/receiver modules 14-k and 31 to Sleep. The synchronization packet and the synchronization response packet also contain information required to cause the transmitter/receiver modules 14-k and 31 to wake up from Sleep simultaneously.

The synchronization packet and the synchronization response packet are transmitted between the transmitter/receiver module 14-k and the transmitter/receiver module 31 via a data communication channel established in an optical-fiber transmission path included in the communication line 2-k. Alternatively, the synchronization packet and the synchronization response packet may be transmitted between the transmitter/receiver module 14-k and the transmitter/receiver module 31 via a control-communication network provided independently from the communication line 2-k.

Figure 3A:
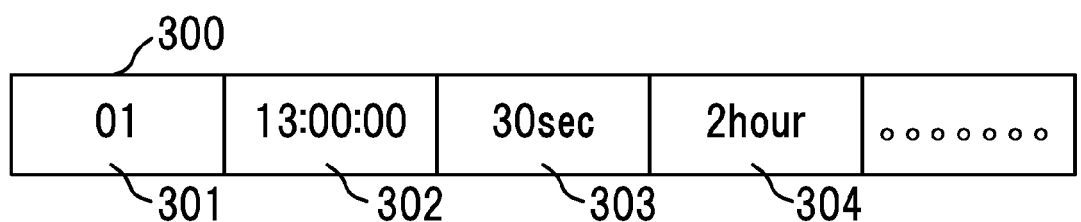
FIG. 3A illustrates one example of a synchronization packet and FIG. 3B illustrates one example of a synchronization response packet.
Figure 3B:
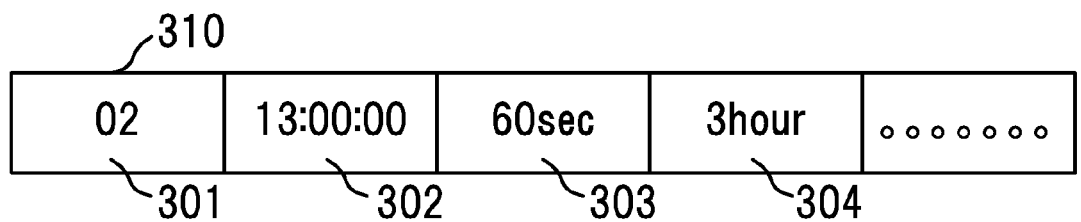

FIG. 3A illustrates one example of the synchronization packet. FIG. 3B illustrates one example of the synchronization response packet. A synchronization packet 300 and a synchronization response packet 310 each contain an identification flag 301, sleep start time 302, an adjustment time 303, and a sleep time 304.

The identification flag 301 indicates whether a packet is a synchronization packet or a synchronization response packet. For example, when the value of the identification flag 301 is "01", a packet containing the identification flag 301 is a synchronization packet, and when the value of the identification flag 301 is "02", a packet containing the identification flag 301 is a synchronization response packet.

The sleep start time 302 indicates time at which the sleep-mode change processing is started. The sleep start time 302 may be set to, for example, time at which a command for changing the operating mode of the transmitter/receiver module 14-k to Sleep is reported from the high-order system to the device control circuit 11. Alternatively, the sleep start time 302 may be set to sleep start time stored in the memory included in the control circuit 22 or the memory included in the device control circuit 11.

The adjustment time 303 indicates an adjustment period for causing two transmitter/receiver modules that communicate with each other to change to the sleep modes. For example, the adjustment time 303 is set to a time between 0 second and 60 seconds.

The sleep time 304 indicates a period in which two transmitter/receiver modules that communicate with each other are in the sleep modes.

By referring to the adjustment times and the sleep start times contained in the synchronization packet and the synchronization response packet, the control circuit 22 of the transmitter/receiver module 14-k matches the time at which the operating mode of the transmitter/receiver module 14-k is to be changed to Sleep with the time at which the operating mode of the transmitter/receiver module 31 is to be changed to Sleep. By referring to the sleep times contained in the synchronization packet and the synchronization response packet, the control circuit 22 matches the time at which the transmitter/receiver module 14-k is to be restarted with the time at which the transmitter/receiver module 31 is to be restarted.

Each of the synchronization packet and the synchronization response packet may contain time at which the transmitter/receiver module is to be restarted, instead of the sleep time. The sleep start time may be time at which the operating mode of the transmitter/receiver module is to be changed to Sleep. In this case, the control circuit 22 starts the sleep-mode change processing when a predetermined time before the sleep start time is reached. The predetermined time is set to a sufficient amount of time for executing the sleep-mode change processing, for example, to five minutes. Through exchange of the synchronization packet and the synchronization response packet between the transmitter/receiver module 14-k and the transmitter/receiver module 31, the control circuit 22 adjusts the sleep start time and the sleep time. Thereafter, when the sleep start time is reached, the control circuit 22 changes the operating mode of the transmitter/receiver module 14-k to Sleep. With this arrangement, since the control circuit 22 does not use the adjustment time, the synchronization packet and the synchronization response packet do not necessarily have to contain the adjustment times.

In addition, the synchronization packet may contain a priority of the transmitter/receiver module that transmits the synchronization packet or a priority of the transmission device having the transmitter/receiver module. Similarly, the synchronization response packet may contain a priority of the transmitter/receiver module that transmits the synchronization response packet or a priority of the transmission device having the transmitter/receiver module.

Figure 4:
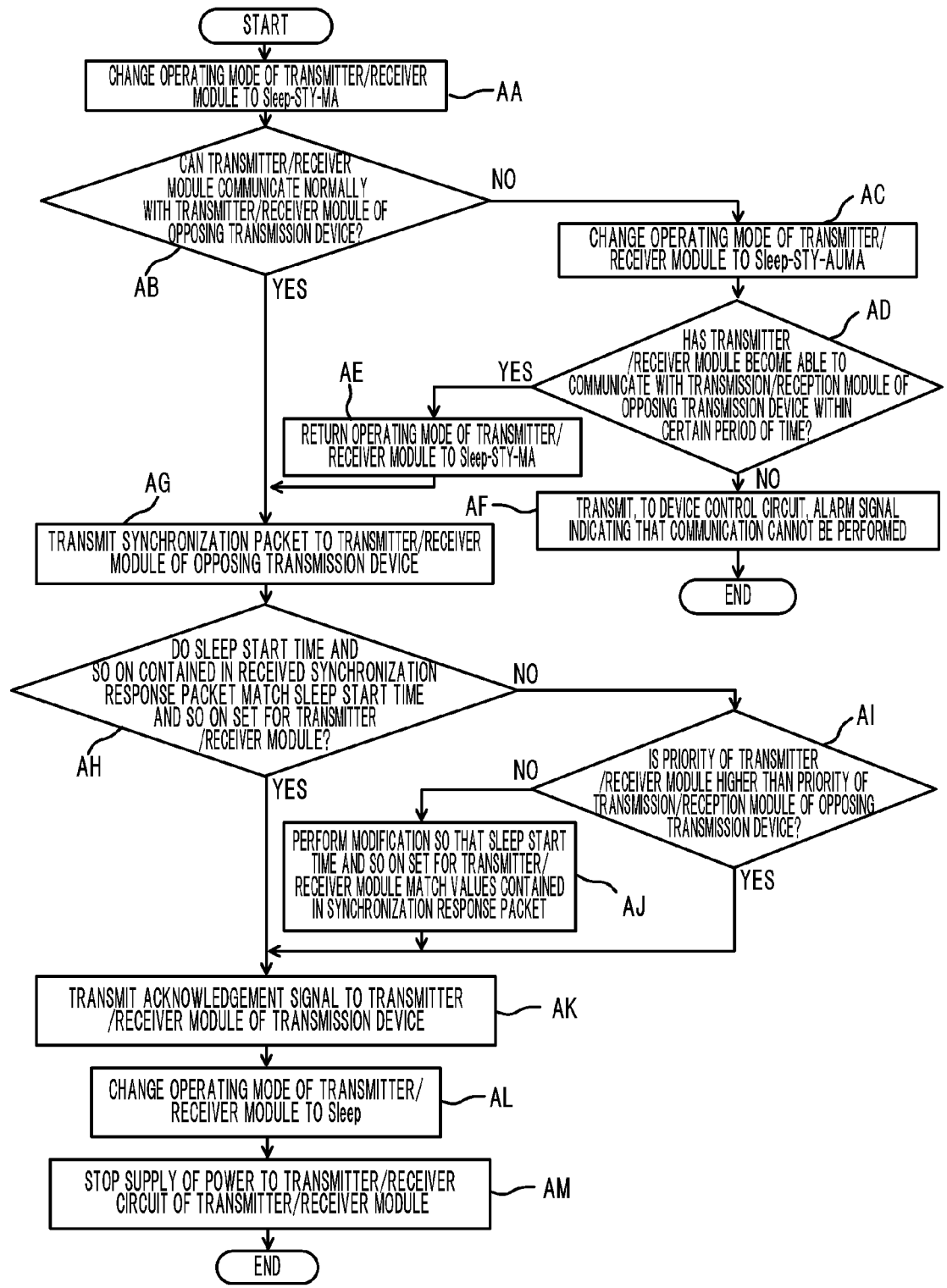
FIG. 4 is a flowchart illustrating one example of sleep-mode change processing for changing the operating mode of the transmitter/receiver module to a sleep mode.

FIG. 4 is a flowchart illustrating one example of the sleep-mode change processing for changing the operating mode of the transmitter/receiver module 14-k is Sleep.

The control circuit 22 of the transmitter/receiver module 14-k changes the operating mode of the transmitter/receiver module 14-k from OOS-MA to Sleep-STY-MA (in operation AA), when a control signal Sleep-STY for putting the operating mode of the transmitter/receiver module 14-k into Sleep is received from the device control circuit 11. Alternatively, when the sleep start time stored in the memory included in the control circuit 22 is reached, the control circuit 22 executes operation AA.

Next, the control circuit 22 executes normality check processing (in operation AB) to check whether or not the transmitter/receiver module 14-k can communicate normally with the transmitter/receiver module 31 of the transmission device 3 opposing the transmitter/receiver module 14-k. When it is determined that the transmitter/receiver module 14-k cannot communicate normally with the transmitter/receiver module 31 (i.e., No in operation AB), the control circuit 22 changes the operating mode of the transmitter/receiver module 14-k to Sleep-STY-AUMA (in operation AC). Thereafter, the control circuit 22 re-checks whether or not the transmitter/receiver module 14-k has become able to communicate normally with the transmitter/receiver module 31 for a certain period of time (in operation AD). The certain period of time is set to, for example, 60 seconds.

The control circuit 22 causes the transmitter/receiver circuit 21 to transmit a predetermined test signal to the transmitter/receiver module 31 for the normality check processing. The transmitter/receiver module 31 transmits a response signal for the predetermined test signal to the transmitter/receiver circuit 21. Upon receiving the predetermined test signal, the transmitter/receiver circuit 21 generates line state information on the basis of the response signal. The transmitter/receiver circuit 21 then reports the generated line state information to the control circuit 22. On the basis of the line state information, the control circuit 22 determines whether or not the transmitter/receiver module 14-k can communicate normally with the transmitter/receiver module 31. For example, when the line state information is a bit error rate measured for the response signal and the bit error rate has a value indicating that the response signal can be reproduced, the control circuit 22 determines that the transmitter/receiver module 14-k can communicate normally with the transmitter/receiver module 31. On the other hand, when the bit error rate has a value indicating that the response signal cannot be reproduced, the control circuit 22 determines that the transmitter/receiver module 14-k cannot communicate normally with the transmitter/receiver module 31. When the line state information indicates a result of frame detection for the response signal and the line state information indicates that a frame for the response signal was successfully detected, the control circuit 22 determines that the transmitter/receiver module 14-k can communicate normally with the transmitter/receiver module 31. On the other hand, when the line state information indicates that a frame for the response signal was not successfully detected, the control circuit 22 determines that the transmitter/receiver module 14-k cannot communicate normally with the transmitter/receiver module 31.

When the transmitter/receiver module 14-k has become able to communicate normally with the transmitter/receiver module 31 within the certain period of time (i.e., Yes in operation AD), the control circuit 22 returns the operating mode of the transmitter/receiver module 14-k to Sleep-STY-MA (in operation AE). Thereafter, the control circuit 22 proceeds control to operation AG. On the other hand, when the transmitter/receiver module 14-k has not become able to communicate normally with the transmitter/receiver module 31 even when the certain period of time has passed (i.e., No in operation AD), the control circuit 22 passes an alarm signal indicating that communication cannot be performed to the device control circuit 11 (in operation AF). Thereafter, the control circuit 22 ends the sleep-mode change processing.

On the other hand, when it is determined in operation AB that the transmitter/receiver module 14-k can communicate normally with the transmitter/receiver module 31 (i.e., Yes in operation AB) or when operation AE is finished, the control circuit 22 generates a synchronization packet containing the sleep start time, the adjustment time, and the sleep time. The control circuit 22 passes the generated synchronization packet to the transmitter/receiver circuit 21 of the transmitter/receiver module 14-k. The control circuit 22 causes the transmitter/receiver circuit 21 to transmit the generated synchronization packet to the transmitter/receiver module 31 (In operation AG).

Next, the control circuit 22 refers to a synchronization response packet received from the transmitter/receiver module 31 of the transmission device 3. Thereafter, the control circuit 22 makes a determination (in operation AH) as to whether or not the sleep start time, the adjustment time, and the sleep time contained in the synchronization response packet match the sleep start time, the adjustment time, and the sleep time set for the transmitter/receiver module 14-k. Any of the sleep start time, the adjustment time, and the sleep time contained in the synchronization response packet may not match the corresponding sleep start time, the adjustment time, and the sleep time set for the transmitter/receiver module 14-k (i.e., No in operation AH). In such a case, the control circuit 22 makes a determination (in operation AI) as to whether or not the priority of the transmitter/receiver module 14-k is higher than the priority of the transmitter/receiver module 31. It is preferable that the priority be a number that is uniquely set for each transmission device or for each transmitter/receiver module. For example, the priority may be an identification number of each transmission device or transmitter/receiver module. In this case, the control circuit 22 determines that the priority is higher as the identification number increases. Alternatively, the control circuit 22 may determine that the priority is higher as the identification number decreases.

When the priority of the transmitter/receiver module 14-k is lower than the priority of the transmitter/receiver module 31 of the transmission device 3 (i.e., No in operation AI), the control circuit 22 modifies the sleep start time and so on set for the transmitter/receiver module 14-k. More specifically, the control circuit 22 matches the sleep start time, the adjustment time, and the sleep time set for the transmitter/receiver module 14-k with the sleep start time, the adjustment time, and the sleep time contained in the synchronization response packet (in operation AJ). The control circuit 22 stores the modified sleep start time, the adjustment time, and the sleep time in the memory included in the control circuit 22.

After operation AJ, the control circuit 22 causes an acknowledgement signal indicating that the synchronization response packet is received to be transmitted to the transmitter/receiver module 31 of the transmission device 3 (in operation AK). Thereafter, when it is determined in operation AH that the sleep start time, the adjustment time, and the sleep time contained in the synchronization response packet match the sleep start time, the adjustment time, and the sleep time set for the transmitter/receiver module 14-k (i.e., Yes in operation AH), the control circuit 22 also executes operation AK. Similarly, when the priority of the transmitter/receiver module 14-k is higher than the priority of the transmitter/receiver module 31 of the transmission device 3 (i.e., Yes in operation AI), the control circuit 22 also executes operation AK.

When a time obtained by adding half the round trip time (RTT) between the transmitter/receiver module 14-k and the transmitter/receiver module 31 to the predetermined adjustment time passes after operation AK, the control circuit 22 notifies the device control circuit 11 that the operating mode of the transmitter/receiver module 14-k is to change to Sleep. The control circuit 22 then changes the operating mode of the transmitter/receiver module 14-k to Sleep (in operation AL). The control circuit 22 also stops the supply of power from the power-supply circuit 13 to the transmitter/receiver circuit 21 (in operation AM). Thereafter, the control circuit 22 ends the sleep-mode change processing.

The control circuit 22 uses the timer included therein to measure a time that elapses from when the operating mode of the transmitter/receiver module 14-k changes to Sleep. When the elapsed time reaches the sleep time stored in the memory of the control circuit 22, the control circuit 22 restarts the transmitter/receiver module 14-k and changes the operating mode of the transmitter/receiver module 14-k to Sleep-STY-MA. Thereafter, the control circuit 22 executes normality check processing for checking whether or not the transmitter/receiver module 14-k can communicate normally with the transmitter/receiver module 31 of the transmission device 3. When it is confirmed in the normality check processing that the transmitter/receiver module 14-k can communicate normally with the transmitter/receiver module 31, the control circuit 22 changes the operating mode of the transmitter/receiver module 14-k to OOS-MA. On the other hand, when it is not confirmed in the normality check processing that the transmitter/receiver module 14-k can communicate normally with the transmitter/receiver module 31, the control circuit 22 changes the operating mode of the transmitter/receiver module 14-k to Sleep-STY-AUMA.

For example, in a period between operation AK and operation AL, the control circuit 22 may notify the device control circuit 11 about the sleep time in conjunction with the identification number of the transmitter/receiver module 14-k. With this arrangement, the device control circuit 11 can restart the transmitter/receiver module 14-k after the sleep time passes. Thus, in operation AM, the power-supply circuit 13 can stop the supply of power not only to the transmitter/receiver circuit 21 of the transmitter/receiver module 14-k but also to the control circuit 22 of the transmitter/receiver module 14-k.

After the transmitter/receiver module 14-k is restarted, the control circuit 22 may determine next sleep start time on the basis of the sleep start time stored in the memory included in the control circuit 22. The control circuit 22 stores the next sleep start time in the memory included in the control circuit 22. Alternatively, the control circuit 22 notifies the device control circuit 11 about the next sleep start time. In this case, the control circuit 22 sets the next sleep start time, for example, by adding a predetermined period of time to the original sleep start time. The predetermined period of time may be, for example, the interval of periodic maintenance performed for the transmission device 1 or the transmitter/receiver module 14-k. Automatically determining the next sleep start time in this manner allows the control circuit 22 to automatically change the operating mode of the transmitter/receiver module 14-k to Sleep at regular intervals.

The control circuit 22 may also set the next sleep start time on the basis of an operator operation performed via the high-order system.

The transmitter/receiver module 31 of the transmission device 3 opposing the transmitter/receiver module 14-k of the transmission device 1 may start the sleep-mode change processing earlier than the transmitter/receiver module 14-k. In such a case, in operation AG described above, the transmitter/receiver circuit 21 receives a synchronization packet from the transmitter/receiver module 31, instead of transmitting the synchronization packet. The transmitter/receiver circuit 21 then passes the received synchronization packet to the control circuit 22. The control circuit 22 then changes the operating mode of the transmitter/receiver module 14-k from OOS-MA to Sleep-STY-MA. In operation AK, the control circuit 22 causes the transmitter/receiver circuit 21 to transmit a synchronization response packet to the transmitter/receiver module 31. Next, in operation AL, when the predetermined adjustment time passes after the control synchronization response packet is transmitted, the control circuit 22 notifies the device control circuit 11 that the operating mode of the transmitter/receiver module 14-k is to change to Sleep. The control circuit 22 then changes the operating mode of the transmitter/receiver module 14-k to Sleep.

When the specified sleep start time is reached, two transmitter/receiver modules 14-k and 31 simultaneously start the sleep-mode change processing. Thus, of the two transmitter/receiver modules 14-k and 31, only the transmitter/receiver module having a higher priority may transmit a synchronization packet. In this case, the transmitter/receiver module having a lower priority transmits a synchronization response packet.

In addition, after operation AF, the control circuit 22 may change the operating mode of the transmitter/receiver module 14-k to Sleep.

In operation AA in FIG. 4, when the operating mode of the transmitter/receiver module 14-k is OOS-AUMA, the control circuit 22 changes the operating mode of the transmitter/receiver module 14-k to Sleep-STY-AUMA directly. The control circuit 22 executes processing in operation AD and the subsequent operations by skipping operations AB and AC.

FIG. 5 illustrates one example of a sequence in which the operating mode of the transmitter/receiver module 14-k and the operating mode of the transmitter/receiver module 31 of the transmission device 3 opposing the transmitter/receiver module 14-k are changed to Sleep and then the transmitter/receiver modules 14-k and 31 are restarted.

In FIG. 5, an upper line 501 indicates an elapsed time for the transmitter/receiver module 14-k and a lower line 502 indicates an elapsed time for the transmitter/receiver module 31. Time is assumed to run from left to right in the figure.

When the specified sleep start time is reached, the control circuit 22 of the transmitter/receiver module 14-k transmits a synchronization packet to the transmitter/receiver module 31 of the transmission device 3 (in operation BA). In turn, upon receiving the synchronization packet from the transmitter/receiver module 14-k of the transmission device 1, the transmitter/receiver module 31 transmits a synchronization response packet (in operation CA).

Upon receiving the synchronization response packet, the transmitter/receiver module 14-k transmits, to the transmitter/receiver module 31, an acknowledgement signal indicating that the synchronization response packet is received (in operation BB).

When a time obtained by adding half the round trip time between the transmitter/receiver module 14-k and the transmitter/receiver module 31 to the predetermined adjustment time passes after the acknowledgement signal is transmitted, the control circuit 22 changes the operating mode of the transmitter/receiver module 14-k to Sleep (in operation BC).

When the predetermined adjustment time passes after the transmitter/receiver module 31 receives the acknowledgement signal from the transmitter/receiver module 14-k, the operating mode of the transmitter/receiver module 31 of the transmission device 3 is changed to Sleep (in operation CB). That is, the operating modes of the transmitter/receiver module 14-k and the transmitter/receiver module 31 change to Sleep simultaneously.

When the predetermined sleep time passes after the operating modes of the transmitter/receiver module 14-k and the transmitter/receiver module 31 change to Sleep, the control circuit 22 restarts the transmitter/receiver module 14-k and changes the operating mode of the transmitter/receiver module 14-k to Sleep-STY-MA (in operation BD). The transmitter/receiver module 31 is also restarted and the operating mode thereof also changes to Sleep-STY-MA (in operation CC). That is, the transmitter/receiver module 14-k and the transmitter/receiver module 31 are restarted simultaneously.

When the transmitter/receiver module 14-k and the transmitter/receiver module 31 are restarted, the control circuit 22 executes normality check processing (in operation BE) for checking whether or not communication between the transmitter/receiver module 14-k and the transmitter/receiver module 31 can be normally performed.

Upon confirming that communication with the transmitter/receiver module 31 can be normally performed, the control circuit 22 changes the operating mode of the transmitter/receiver module 14-k to OOS-MA (in operation BF). When the transmitter/receiver module 31 also confirms that it can communication normally with the transmitter/receiver module 14, the operating mode of the transmitter/receiver module 31 is changed to OOS-MA (in operation CD).

The transmission device and the method for putting the transmission device to sleep, the device and the method being disclosed herein, make it possible to put a transmission device at an opposite communication end into the sleep mode without issuing an alarm.

As described above, when any one of the transmitter/receiver modules in the transmission device according to one embodiment is to be put into the sleep mode, the transmission device notifies another transmission device opposing the transmitter/receiver module about the sleep start time at which the operating mode is to be changed to the sleep mode. Thus, according to the transmission device, the transmitter/receiver module to be put to sleep can be put into the sleep mode simultaneously with the transmitter/receiver module of the transmission device opposing the transmitter/receiver module. Thus, according to the transmission device, when the transmitter/receiver module is to be changed to the sleep mode, it is possible to prevent the transmission device opposing the transmitter/receiver module from issuing an unwanted alarm. In addition, according to the transmission device, when an arbitrary one of the transmitter/receiver modules is to be put to sleep, the operator does not have to perform any operation on the transmission device opposing the transmitter/receiver module. Additionally, the transmission device notifies the transmission device opposing the transmitter/receiver module to be put to sleep about the sleep time indicating the period of the sleep mode. Thus, according to the transmission device, the transmitter/receiver module that is in the sleep mode can be restarted simultaneously with the transmission device opposing the transmitter/receiver module. Accordingly, according to the transmission device, during restart of the transmitter/receiver module, it is possible to prevent the transmission device or the opposing transmission device from issuing an alarm indicating that communication cannot be performed.

The present invention is not limited to the above-described embodiments. For example, in FIG. 1, the device control circuit 11 may control the operating modes of the transmitter/receiver modules 14-1 to 14-n. In such a case, the device control circuit 11 stores, in the memory included in the device control circuit 11, the current operating modes of the transmitter/receiver modules 14-1 to 14-n in conjunction with identification numbers of the transmitter/receiver modules 14-1 to 14-n. In addition, the sleep start times, the adjustment times, and the sleep times set for the transmitter/receiver modules 14-1 to 14-n are stored in the memory included in the device control circuit 11 in conjunction with the identification numbers of the transmitter/receiver modules 14-1 to 14-n.

The device control circuit 11 executes the sleep-mode change processing (described above with reference to FIG. 4), when a command for putting the transmitter/receiver module 14-k to sleep is received from the high-order system or when the set sleep start time is reached. In this case, in operation AM in FIG. 4, the power-supply circuit 13 may stop the supply of power not only to the transmitter/receiver circuit 21 of the transmitter/receiver module 14-k but also to the control circuit 22 of the transmitter/receiver module 14-k. In operation AG in FIG. 4, when a communication line other than the communication line 2-k is available for coupling the transmission device 1 to the transmission device 3, the device control circuit 11 may transmit the synchronization packet via a data communication channel established in the communication line other than the communication line 2-k.

The transmission device may also have another configuration. For example, the transmission device may be a wavelength-division-multiplexing optical transmission device. In such a case, the transmitter/receiver modules included in the optical transmission device are coupled to corresponding user lines (not illustrated). Each transmitter/receiver module outputs an optical signal having one wavelength corresponding to a signal received via the user line. The optical signals output from the transmitter/receiver modules are multiplexed by a multiplexer (not illustrated). The multiplexed optical signal is transmitted to an opposing optical transmission device via an optical transmission path such as an optical fiber. In turn, the optical transmission device receives a multiplexed optical signal from the opposing optical transmission device via the optical transmission path. A demultiplexer (not illustrated) in the optical transmission device then demultiplexes the received optical signal into optical signals for individual wavelengths and passes the demultiplexed optical signals having the individual wavelengths to the corresponding transmitter/receiver modules.

In this case, the operating modes of the transmitter/receiver modules of the optical transmission device also change according to the mode changes illustrated in FIG. 2. A control circuit included in each transmitter/receiver module or a device control circuit included in the optical transmission device can execute the sleep-mode change processing (illustrated in FIG. 4) to thereby change the operating mode of each transmitter/receiver module to Sleep.

When other transmission devices to/from which each transmitter/receiver module of the transmission device transmits/receives a data signal are predetermined, each transmitter/receiver module may communicate with two or more other transmission devices. In such a case, the control circuit for the transmitter/receiver module can execute the sleep-mode change processing (illustrated in FIG. 4) by exchanging the synchronization packet and the synchronization response packet with all transmission devices that communicate with the transmitter/receiver module.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission device, comprising:
    at least one transceiver circuit that is coupled to another transmission device via a communication line; and
    a control unit that notifies the other transmission device about first sleep start information specifying a time at which an operating mode of the at least one transceiver circuit is to be changed to a sleep mode and that stops a supply of power to the at least one transceiver circuit at the time specified by the first sleep start information, and receives, from the other transmission device, second sleep start information specifying a time at which an operating mode of the other transmission device is to be changed to a sleep mode, the control circuit stops a supply of power to the at least one transceiver circuit at the time specified by the second sleep start information such that the at least one transceiver circuit is always in the sleep mode during a same time in which the other transmission device is in the sleep mode,
    wherein, when the control circuit receives, from the other transmission device, second sleep start information specifying a time at which an operating mode of the other transmission device is to be changed to a sleep mode and the time specified by the first sleep start information is different from the time specified by the second sleep start information, when a priority of the at least one transceiver circuit is higher than a priority of the other transmission device, the control circuit stops the supply of power to the at least one transceiver circuit at the time specified by the first sleep start information, and when the priority of the at least one transceiver circuit is lower than the priority of the other transmission device, the control circuit stops the supply of power to the at least one transceiver circuit at the time specified by the second sleep start information.

2. The transmission device according to claim 1, wherein the first sleep start information further comprises a sleep time from when the supply of power to the at least one transceiver circuit is stopped until the supply of power is resumed.

3. The transmission device according to claim 1, wherein, when the at least one transceiver circuit is unable to receive a signal from the other transmission device before the time specified by the first sleep start information, the control circuit outputs an alarm signal indicating that the at least one transceiver circuit is unable to communicate with the other transmission device, and when the at least one transceiver circuit is unable to receive a signal from the other transmission device after the time specified by first the sleep start information, the control circuit does not output the alarm signal.

4. A method for putting a transmission device to sleep, the transmission device having at least one transceiver circuit that is coupled to another transmission device via a communication line, the method comprising:
    notifying the other transmission device about first sleep start information specifying a time at which an operating mode of the at least one transceiver circuit is to be changed to a sleep mode;
    stopping a supply of power to the at least one transceiver circuit at the time specified by the first sleep start information and, when receiving second sleep start information from the other transmission device specifying a time at which an operating mode of the other transmission device is to be changed to a sleep mode, stopping a supply of power to the at least one transceiver circuit at the time specified by the second sleep start information such that the at least one transceiver circuit is always in the sleep mode during a same time in which the other transmission device is in the sleep mode; and
    when receiving, from the other transmission device, second sleep start information specifying a time at which an operating mode of the other transmission device is to be changed to a sleep mode and the time specified by the first sleep start information is different from the time specified by the second sleep start information, stopping the supply of power to the at least one transceiver circuit at the time specified by the first sleep start information, when a priority of the at least one transceiver circuit is higher than a priority of the other transmission device, and stopping the supply of power to the at least one transceiver circuit at the time specified by the second sleep start information, when the priority of the at least one transceiver circuit is lower than the priority of the other transmission device.

5. The method for putting a transmission device to sleep according to claim 4, wherein the first sleep start information further comprises a sleep time from when the supply of power to the at least one transceiver circuit is stopped until the supply of power is resumed.

6. The method for putting a transmission device to sleep according to claim 4, the method further comprising:
    outputting an alarm signal indicating that the at least one transceiver circuit is unable to communicate with the other transmission device, when the at least one transceiver circuit is unable to receive a signal from the other transmission device before the time specified by the first sleep start information.

* * * * *